United States Patent
Philippe et al.

(10) Patent No.: US 12,053,957 B2
(45) Date of Patent: Aug. 6, 2024

(54) METHOD FOR THE PRODUCTION OF A PART MADE FROM A COMPOSITE MATERIAL, BY MEANS OF THE INJECTION OF POWDER INTO A FIBROUS REINFORCEMENT WITH DRAINAGE THROUGH A COMPOSITE FILTRATION LAYER

(71) Applicant: SAFRAN CERAMICS, Le Haillan (FR)

(72) Inventors: Eric Philippe, Moissy-Cramayel (FR); Medhy Damien Bounia, Moissy-Cramayel (FR); Aurélia Clerambourg, Moissy-Cramayel (FR); Paul Carminati, Merignac (FR)

(73) Assignee: SAFRAN CERAMICS, Le Haillan (FR)

( * ) Notice: Subject to any disclaimer, the term of this patent is extended or adjusted under 35 U.S.C. 154(b) by 611 days.

(21) Appl. No.: 16/958,558

(22) PCT Filed: Dec. 21, 2018

(86) PCT No.: PCT/FR2018/053527
§ 371 (c)(1),
(2) Date: Jun. 26, 2020

(87) PCT Pub. No.: WO2019/129983
PCT Pub. Date: Jul. 4, 2019

(65) Prior Publication Data
US 2020/0339480 A1    Oct. 29, 2020

(30) Foreign Application Priority Data
Dec. 28, 2017   (FR) ..................... 1763335

(51) Int. Cl.
*B32B 18/00* (2006.01)
*B28B 1/00* (2006.01)
(Continued)

(52) U.S. Cl.
CPC .............. *B32B 18/00* (2013.01); *B28B 1/002* (2013.01); *B28B 1/24* (2013.01); *B28B 1/265* (2013.01);
(Continued)

(58) Field of Classification Search
CPC ........................................ B28B 1/24
See application file for complete search history.

(56) References Cited

U.S. PATENT DOCUMENTS

| | | | | |
|---|---|---|---|---|
| 1,149,069 | A * | 8/1915 | Mauersberger | B62D 33/02 296/180 |
| 5,020,983 | A * | 6/1991 | Ito | B28B 1/262 425/84 |

(Continued)

FOREIGN PATENT DOCUMENTS

| CH | 614884 A5 * | 12/1979 |
|---|---|---|
| EP | 0 573 353 A1 | 12/1993 |

(Continued)

OTHER PUBLICATIONS

Machine translation CH614884A5 (Year: 1979).*
(Continued)

*Primary Examiner* — Jacob T Minskey
*Assistant Examiner* — Wayne K. Swier
(74) *Attorney, Agent, or Firm* — Pillsbury Winthrop Shaw Pittman LLP

(57) ABSTRACT

A process for manufacturing a composite material part includes formation of a fibrous texture from refractory ceramic fibres, placement of the fibrous texture in a mould with interposition of a filtration layer between the fibrous (Continued)

texture and a discharge port, the filtration layer including a partially densified fibrous structure, pressure injection of a slurry containing a powder of refractory ceramic particles into the fibrous texture, drainage by the filtration layer of the slurry solvent having passed through the fibrous texture and retention of the powder of refractory ceramic particles within the texture by the filtration layer to obtain a fibrous preform including the fibrous texture filled with refractory ceramic particles and the filtration layer, heat treatment of the refractory ceramic particles present in the fibrous texture of the preform to form a composite material part including the fibrous texture densified by a refractory ceramic matrix and the filtration layer.

12 Claims, 6 Drawing Sheets

(51) Int. Cl.
| | | |
|---|---|---|
| B28B 1/24 | (2006.01) | |
| B28B 1/26 | (2006.01) | |
| B28B 23/00 | (2006.01) | |
| C04B 35/117 | (2006.01) | |
| C04B 35/14 | (2006.01) | |
| C04B 35/18 | (2006.01) | |
| C04B 35/185 | (2006.01) | |
| C04B 35/447 | (2006.01) | |
| C04B 35/488 | (2006.01) | |
| C04B 35/56 | (2006.01) | |
| C04B 35/565 | (2006.01) | |
| C04B 35/58 | (2006.01) | |
| C04B 35/584 | (2006.01) | |
| C04B 35/628 | (2006.01) | |
| C04B 35/64 | (2006.01) | |
| C04B 35/80 | (2006.01) | |
| C04B 41/45 | (2006.01) | |
| G10K 11/168 | (2006.01) | |
| B28B 7/00 | (2006.01) | |

(52) U.S. Cl.
CPC ........ *B28B 23/0006* (2013.01); *C04B 35/117* (2013.01); *C04B 35/14* (2013.01); *C04B 35/18* (2013.01); *C04B 35/185* (2013.01); *C04B 35/447* (2013.01); *C04B 35/488* (2013.01); *C04B 35/56* (2013.01); *C04B 35/565* (2013.01); *C04B 35/5805* (2013.01); *C04B 35/58071* (2013.01); *C04B 35/58092* (2013.01); *C04B 35/584* (2013.01); *C04B 35/62886* (2013.01); *C04B 35/64* (2013.01); *C04B 35/80* (2013.01); *C04B 41/4584* (2013.01); *B28B 7/0058* (2013.01); *C04B 2235/3217* (2013.01); *C04B 2235/3244* (2013.01); *C04B 2235/3418* (2013.01); *C04B 2235/3463* (2013.01); *C04B 2235/3804* (2013.01); *C04B 2235/3817* (2013.01); *C04B 2235/3852* (2013.01); *C04B 2235/3891* (2013.01); *C04B 2235/447* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/616* (2013.01); *G10K 11/168* (2013.01)

(56) References Cited

U.S. PATENT DOCUMENTS

| | | | | |
|---|---|---|---|---|
| 5,415,715 | A * | 5/1995 | Delage | B32B 18/00 |
| | | | | 428/116 |
| 6,497,776 | B1 * | 12/2002 | Butler | B82Y 30/00 |
| | | | | 156/286 |
| 7,059,845 | B2 * | 6/2006 | Mazzanti | B28B 1/262 |
| | | | | 425/84 |
| 9,102,571 | B2 | 8/2015 | Szweda et al. | |
| 11,285,638 | B2 * | 3/2022 | Podgorski | F01D 5/284 |
| 2005/0230863 | A1 * | 10/2005 | Scott | B29B 11/16 |
| | | | | 425/464 |
| 2014/0272274 | A1 | 9/2014 | Lazur | |
| 2015/0328799 | A1 | 11/2015 | Szweda et al. | |
| 2019/0134848 | A1 * | 5/2019 | Podgorski | B28B 1/265 |

FOREIGN PATENT DOCUMENTS

| | | |
|---|---|---|
| WO | WO 2014/118216 A1 | 8/2014 |
| WO | WO 2016/102839 A1 | 6/2016 |
| WO | WO 2017/187050 A1 | 11/2017 |

OTHER PUBLICATIONS

International Search Report as issued in International Patent Application No. PCT/FR2018/053527, dated May 28, 2019.

Gugliemi, P.O., et al., "production of Oxide Ceramic Matrix Composites by a Prepreg Technique," Materials Science Forum, vols. 727-728, Aug. 2012, XP055589660, pp. 556-561.

"3M™ Nextel™ Ceramic Structural Rovings and Chopped Fibers 610 and 720," 3M Science™. Applied to Life, 3M Advanced Materials Division, Jul. 2016, XP055589796, Retrieved from the Internet: URL:https://multimedia.3m.com/mws/media/1256264O/3m-nextel-structural-rovings-and-fibers-610-and-720.pdf, 2 pages.

\* cited by examiner

METHOD FOR THE PRODUCTION OF A PART MADE FROM A COMPOSITE MATERIAL, BY MEANS OF THE INJECTION OF POWDER INTO A FIBROUS REINFORCEMENT WITH DRAINAGE THROUGH A COMPOSITE FILTRATION LAYER

CROSS-REFERENCE TO RELATED APPLICATIONS

This application is the U.S. National Stage of PCT/FR2018/053527, filed Dec. 21, 2018, which in turn claims priority to French patent application number 1763335 filed Dec. 28, 2017. The content of these applications are incorporated herein by reference in their entireties.

BACKGROUND OF THE INVENTION

The present invention relates to a process for manufacturing a part made of thermostructural composite material, in particular of the oxide/oxide type or with a ceramic matrix composite (CMC), i.e. comprising a fibrous reinforcement formed from fibres of refractory ceramic material densified by a matrix also made of refractory ceramic material.

Parts made of oxide/oxide composite material are generally produced by draping in a mould a plurality of fibrous layers made from refractory oxide fibres, the layers each being previously impregnated with a slurry filled with refractory oxide particles. The assembly of the layers thus arranged is then compacted by means of a counter-mould or a vacuum tarp and a passage in an autoclave. The filled preform thus obtained is then subjected to a sintering or ceramisation heat treatment in order to form a refractory oxide matrix in the preform and obtain a part made of an oxide/oxide composite material. This technique can also be used to produce carbon-based ceramic matrix composite (CMC) parts. In this case, the fibrous layers are made from silicon carbide (SiC) or carbon fibres and are impregnated with a slurry filled with carbide (for example SiC), boride (for example $TiB_2$), silicide (for example $MoSi_2$) or nitride (for example $Si_3N_4$) particles.

Another solution for manufacturing parts made of oxide/oxide composite or CMC material by the liquid route comprises a step of impregnating a fibrous texture with a slurry filled, for example, with alumina particles in the case of oxide/oxide composite material or silicon carbide (SiC) particles in the case of CMC material. The impregnation step is carried out by injecting a filled slurry under pressure into the fibrous texture (slurry transfer moulding, or STM). In such a case, the liquid phase of the slurry must be drained or filtered in order to obtain an optimal filling of the residual porosities present in the fibrous texture with the solid fillers. Such a process is described in document WO 2016/102839. The use of a filter element interposed between the fibrous texture and the part of the mould through which the solvent of the slurry is evacuated is, therefore, necessary. The filter element may consist of a rigid piece of porous material which must be detached from the fibrous texture when the latter is removed from the mould after injection of the filled slurry and filtration of the solvent.

The use of such a filter element can cause difficulties. Indeed, its removal from the fibrous texture can be tricky and lead to a degradation of the injected fibrous texture. In addition, in the case of fibrous textures with complex geometry, it may be difficult to design a filter element that accommodates both mould geometry and fibrous texture.

Subject Matter and Summary of the Invention

The purpose of the present invention is to remedy the above-mentioned disadvantages and to propose a solution which facilitates the production of parts made of composite material with a ceramic matrix composite (CMC), oxide, carbide or carbon base by injecting a slurry filled in a fibrous texture.

For this purpose, the invention proposes a process for manufacturing a composite material part comprising the following steps:
- formation of a fibrous texture from refractory ceramic fibres,
- placement of the fibrous texture in a mould having at least one injection port and at least one evacuation port, a filtration layer being interposed between the fibrous texture and said at least one evacuation port, the filtration layer comprising a partially densified fibrous structure,
- pressure injection of a slurry containing refractory ceramic particles into the fibrous texture,
- drainage by the filtration layer of the solvent of the slurry having passed through the fibrous texture and retention of the refractory ceramic particles within said texture by the filtration layer so as to obtain a fibrous preform comprising at least the fibrous texture filled with refractory ceramic particles and the filtration layer, the solvent being discharged through said at least one discharge port,
- heat treatment of the refractory ceramic particles present in the fibrous texture of the preform in order to form a composite material part comprising at least said fibrous texture densified by a refractory ceramic matrix and the filtration layer.

Thus, by using a filtration layer that is an integral part of the final composite material part, the problem of removing a filtration element used in the prior art is eliminated. Furthermore, the filtration layer is not rigid and can be shaped in different geometries, which facilitates the production of composite parts with complex shapes.

According to a particular feature of the process of the invention, the filtration layer comprises refractory ceramic fibres of the same nature as the refractory ceramic fibres of the fibrous texture, the filtration layer being partially densified with pre-sintered refractory ceramic particles of the same nature as the refractory ceramic particles deposited in the fibrous texture According to another particular feature of the process of the invention, the filtration layer has an average pore size of between 0.1 μm and 20 μm with an average volume rate of porosity of less than 50%.

According to another particular feature of the process of the invention, the fibrous texture comprises a fibrous structure obtained by two-dimensional weaving or three-dimensional or multi-layer weaving or automatic placement of unidirectional fibres.

According to another particular feature of the process of the invention, the fibrous texture corresponds to a fibrous skin placed opposite one face of a cellular or aerated structure, the fibrous skin and the cellular structure being placed in the mould with the interposition of the filtration layer between said fibrous skin and said cellular structure, the composite material part obtained comprising the fibrous skin densified by a refractory ceramic matrix, the filtration layer and the cellular structure.

According to another particular feature of the process of the invention, the fibrous texture corresponds to a fibrous skin placed opposite the faces of a plurality of alveolar structures, the fibrous skin and the alveolar structures being placed in the mould with interposition of the filtration layer between said fibrous skin and said alveolar structures, the composite material part obtained comprising the fibrous skin densified by a refractory ceramic matrix, the filtration layer and the alveolar structures.

According to another particular feature of the process of the invention, the mould has an annular or frustoconical geometry of revolution, the fibrous texture and the filtration layer being shaped according to an annular or frustoconical geometry of revolution when placed in the mould. In this case, the composite material part obtained may in particular constitute a rear body part, a combustion chamber or a crankcase of an aircraft engine.

The preform yarns may be yarns formed from fibres consisting of one or more of the following materials: alumina, mullite, silica, aluminosilicate, borosilicate, silicon carbide and carbon.

Refractory ceramic particles may be made of a material selected from: alumina, mullite, silica, aluminosilicate, aluminophosphate, zirconia, carbide, boride, silicide and nitride, or a mixture of several of these materials.

BRIEF DESCRIPTION OF THE DRAWINGS

Other features and advantages of the invention will be apparent from the following description of particular embodiments of the invention, given by way of non-limiting examples, with reference to the appended drawings, on which.

DETAILED DESCRIPTION OF EMBODIMENTS

Figure 1:
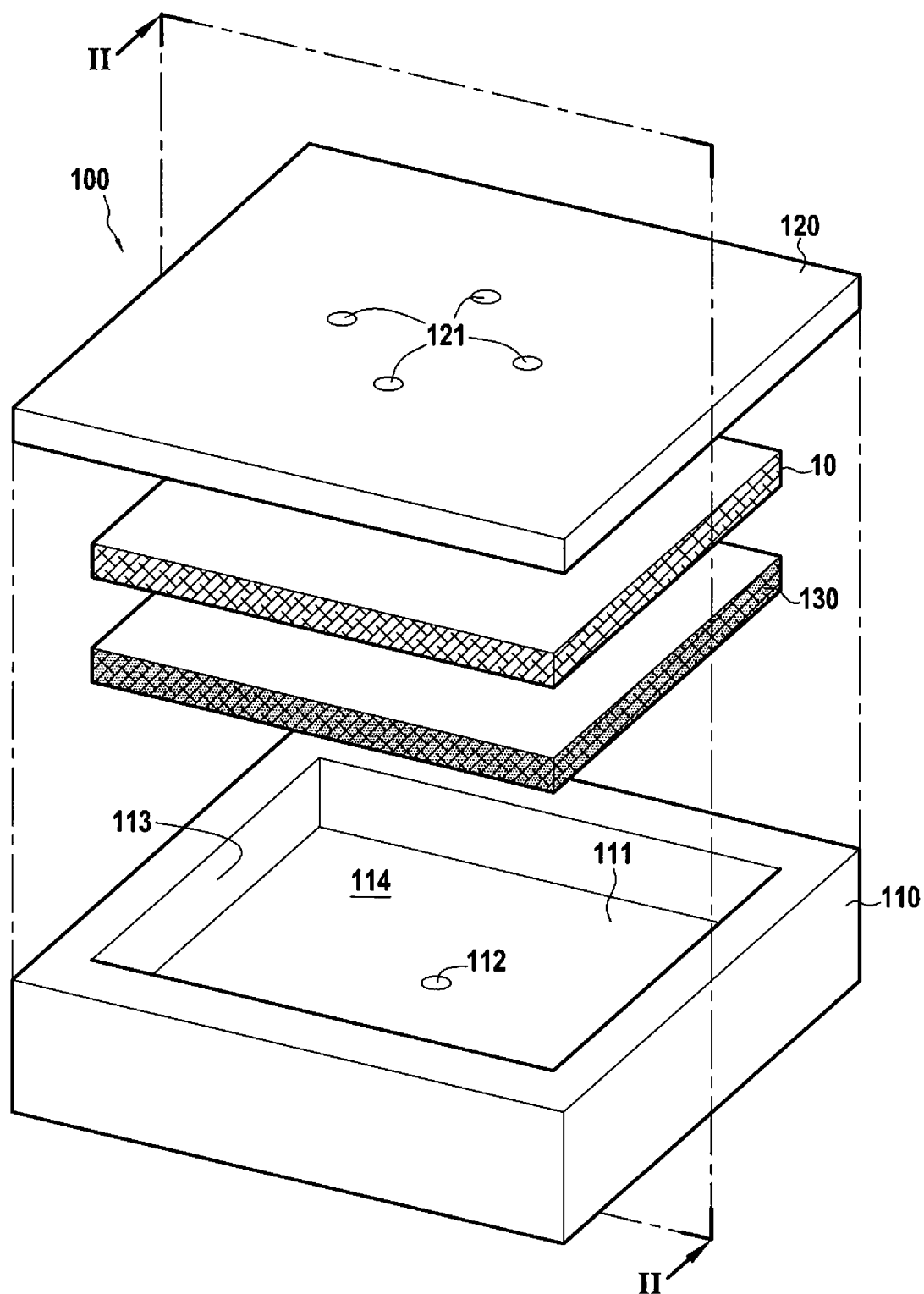
FIG. 1 is an exploded perspective schematic view of a tooling in accordance with an embodiment of the invention.

The process for manufacturing a part made of composite material, in particular of the CMC type, in accordance with the present invention begins with the production of a fibrous texture intended to form the reinforcement of the part.

The fibrous texture is produced in a known manner by weaving by means of a jacquard type loom on which a bundle of warp yarns or strands has been arranged in a plurality of layers, the warp yarns being bound by weft yarns or vice versa. The fibrous texture can be achieved by stacking layers or plies obtained by two-dimensional (2D) weaving. The fibrous texture can also be made directly in one piece by three-dimensional (3D) weaving. "Two-dimensional weaving" is a classical weaving method in which each weft thread passes from one side to the other of yarns of a single warp layer or vice versa. The process of the invention is particularly adapted to allow the introduction of a filled slurry into 2D fibrous textures, i.e. textures obtained by stacking 2D layers or plies of significant thickness, i.e. 2D fibrous structures having a thickness of at least 0.5 mm, preferably at least 1 mm.

"Three-dimensional weaving" or "3D weaving" or "multi-layer weaving" means here a weaving method by which at least some of the weft yarns bind warp yarns on several layers of warp yarns or vice versa according to a weave corresponding to a weave which can be chosen in particular from one of the following weaves: interlock, multi-weft, multi-satin and multi-twill weave.

The term "interlock weave" is used here to describe a 3D weave in which each layer of warp yarns links several layers of weft yarns with all the yarns of the same warp column having the same movement in the plane of the weave.

The term "multi-ply weave" is used here to describe a 3D weave with several layers of weft yarns, the basic weave of each layer being equivalent to a conventional plain weave but with certain points in the weave binding the layers of weft yarns together.

The term "multi-satin weave" is used here to describe a 3D weave with several layers of weft yarns, the basic weave of each layer being equivalent to a classic satin weave but with certain points in the weave which bind the layers of weft yarns together.

The term "multi-twill weave" is used here to describe a 3D weave with several layers of weft yarns, the basic weave of each layer being equivalent to a conventional twill weave but with certain points in the weave binding the layers of weft yarns together.

3D textures have a complex geometry in which it is difficult to introduce and evenly distribute suspended solid particles. The process of the invention is also very well suited for the introduction of filled slurry into 3D woven fibrous textures.

The fibrous texture can also be made from unidirectional (UD) layers or webs shaped as described in U.S. Pat. No. 9,102,571 or US 2015/328799.

The yarns used to weave the fibrous texture intended to form the fibrous reinforcement of the composite part may be formed in particular from refractory ceramic fibres made of one of the following materials: alumina, mullite, silica, aluminosilicate, borosilicate, silicon carbide, carbon or a mixture of several of these materials.

Once the fibrous texture has been produced, it is placed in a tooling comprising a filtration layer conforming to the invention which allows, as explained below, densification of the fibrous texture with refractory ceramic particles.

Figure 2:
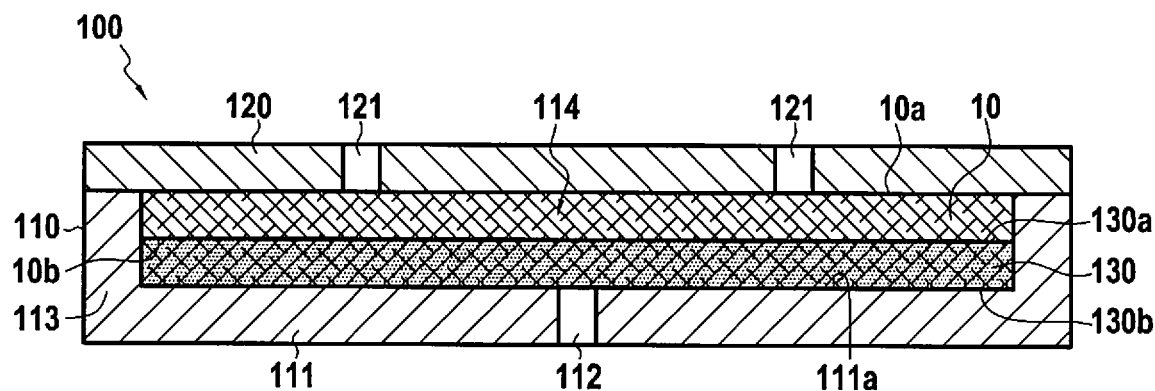
FIG. 2 is a schematic sectional view showing the tooling in FIG. 1 closed with a fibrous texture and a filtration layer positioned therein.

According to a first example illustrated in FIGS. 1 and 2, a fibrous texture 10 is placed in a tool 100. In the example described here, the fibrous texture 10 is produced according to one of the techniques defined above (UD or 2D layering or 3D weaving) with Nextel 610™ alumina yarns. The fibrous texture 10 is here intended to form the fibrous reinforcement of a part made of an oxide/oxide composite material.

The tool 100 consists of a mould 110 and a counter-mould 120. The mould 110 comprises a bottom 111 with a vent 112. The mould 110 also includes a side wall 113 which forms a mould cavity 114 with the bottom 111. In the example shown, the tool 100 in which the fibrous texture 10 is present is closed in its lower part by the mould 110 and is closed in its upper part by the counter-mould 120 forming a lid closing the tool 100. The mould 110 and the counter-mould 120 serve to dimension the preform and thus the part to be obtained and to adjust the fibre content in the part to be obtained.

The counter-mould 120 has a plurality of injection ports 121 through which a liquid filled with refractory ceramic particles is intended to be injected to penetrate the porosity of the fibrous texture 10 through the first face 10*a* of the fibrous texture 10. In the example shown in FIGS. 1 and 2, the filled liquid is intended to be injected through a plurality of injection ports 121 opening in different areas of the mould cavity. However, it is not beyond the scope of the invention when the liquid is injected through a single injection port.

The mould 110, in turn, has a single liquid vent 112. Of course, the scope of the invention is not exceeded when a plurality of outlet vents is implemented.

In accordance with the invention, a filtration layer 130 is interposed between the fibrous texture 10 and the bottom 111 of the mould 110 comprising the vent 112. The filtration layer according to the invention corresponds to a fibrous structure obtained by depositing a unidirectional (UD), two-dimensional (2D) or three-dimensional (3D) weave of yarns of refractory ceramic fibres constituted by at least one of the following materials: alumina, mullite, silica, an aluminosilicate, a borosilicate, silicon carbide, carbon or a mixture of several of these materials. The filtration layer is preferably made of refractory ceramic fibres of the same nature as the refractory ceramic fibres of the fibrous texture. The filtration layer preferably has a thickness of between 0.1 mm and 1 mm.

In the example described here, the filtration layer 130 corresponds to a 2D fabric layer made of Nextel 610™ alumina yarns.

The filtration layer according to the invention is partially densified in order to form in the layer a network of porosity of a given size allowing the filtrate of the slurry, namely the liquid phase thereof, to pass through, while retaining the particles of refractory ceramics present in the injected slurry.

As an example, the filtration layer, once partially densified, can have an average pore size of between 0.1 µm and 20 µm with an average volume porosity of less than 50%.

The fibrous structure intended to form the filtration layer can be partially densified by several methods. In particular, the fibrous structure can be pre-impregnated or infused with a slurry filled with refractory particles. In this case, the densification rate and, consequently, the porosity rate present in the filtration layer after the pre-sintering of the particles is adjusted by controlling the particle size, the filler rate and the binder in the slurry. The filtration layer can also be obtained by injecting a refractory particle filled slurry into the fibrous structure, the amount of particles initially introduced controlling the packing thickness and therefore the final matrix volume ratio (Tvm). Coating or quenching processes can also be used to partially densify the fibrous texture intended to form the filtration layer.

In the example described here, the filtration layer 130 is made from a 2D fabric of alumina yarns which has been infused with a slurry filled with 25% by volume of alumina particles, the particles having been pre-sintered to partially densify the filtration layer.

The filtration layer 130 allows the solvent in the slurry to drain out of the fibrous texture 10 and be discharged through the outlet vent 112 due to the application of a pressure gradient between the outlet vent 112 and the injection ports 121.

Prior to the injection of a slurry into the fibrous texture 10, a compaction pressure to compact the fibrous texture 10 between the mould 110 and the counter-mould 120 can be applied by clamping the mould or by means of a press, and this compaction pressure can be maintained during the injection process. The compaction pressure can also be exerted by a compaction liquid via a membrane as in the Polyflex process.

Alternatively, the compaction pressure can be applied after the start of injection of the filled liquid and can then be maintained. The application of compaction pressure can be used to compact the texture to help drain the liquid and achieve a target thickness for the fibrous preform without damaging the preform.

Figure 3:
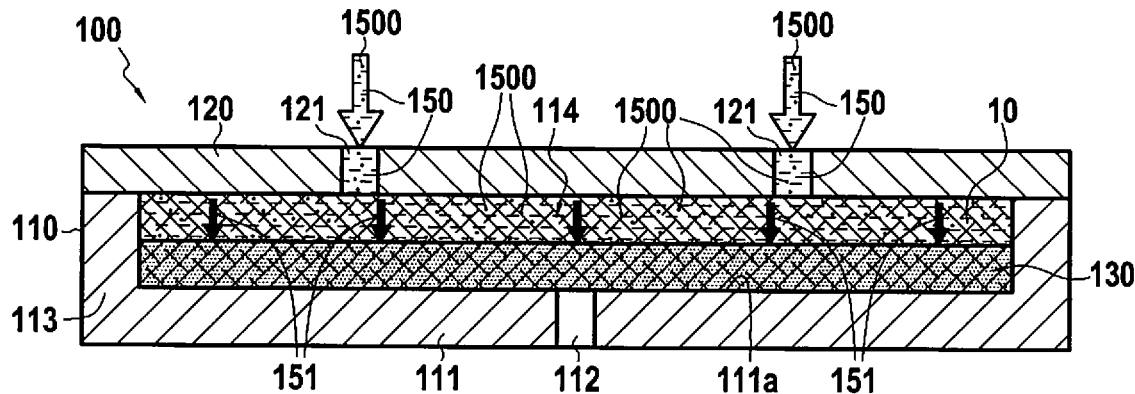
FIG. 3 is a schematic sectional view showing the steps of impregnating a fibrous texture with a slurry filled into the tooling of FIG. 2 in accordance with an embodiment of the process of the invention.

In the example described here, the filled liquid is a slurry containing refractory ceramic particles. FIG. 3 shows the configuration obtained during the injection of a slurry 150 and the drainage of the liquid medium from the slurry. The slurry 150 was injected under pressure through injection ports 121 so as to penetrate the fibrous texture 10 through its first face 10*a*. The refractory ceramic particles 1500 present in the slurry 150 are intended to allow the formation of a refractory ceramic matrix in the porosity of the fibrous texture 10. This refractory ceramic matrix can, in one example, be a refractory oxide matrix.

The slurry can for example be a suspension of alumina powder in water. The average particle size (D50) of the alumina powder can be between 0.1 µm and 2 µm. The alumina powder used can be an alpha alumina powder.

More generally, the slurry can be a suspension comprising refractory ceramic particles with an average particle size of between 0.1 µm and 10 µm. The volume content of particles in the slurry may, prior to injection, be between 5% and 50%. The refractory ceramic particles may comprise a material selected from: alumina, mullite, silica, an aluminosilicate, an aluminophosphate, zirconia, a carbide, a boride, a silicide and a nitride or a precursor of one or more of these materials. Depending on their basic composition, the refractory ceramic particles can, in addition, be mixed with particles of alumina, zirconia, aluminosilicate, a rare earth oxide, a rare earth silicate (which can for example be used in environmental or thermal barriers) or any other filler for functionalizing the composite material part to be obtained such as carbon black, graphite or silicon carbide.

The solvent for slurry may, for example, comprise an aqueous phase with an acidic pH (i.e. a pH below 7) and/or an alcoholic phase containing, for example, ethanol. The slurry may contain an acidifying agent such as nitric acid and the pH of the liquid medium may, for example, be between 1 and 5. The slurry may also contain an organic binder such as polyvinyl alcohol (PVA) which is soluble in water.

Figure 4:
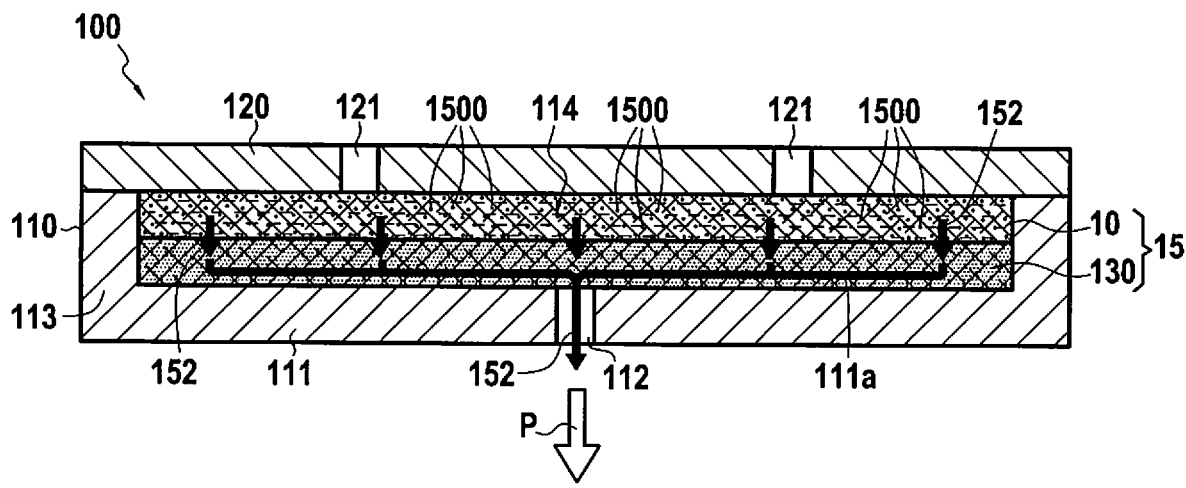
FIG. 4 is a schematic cross-sectional view showing the fibrous texture of FIG. 3 when filled with refractory ceramic particles.

As shown in FIG. 3, the refractory ceramic particles 1500 are present after injection of the slurry 150 into the porosity of the fibrous texture 10. The arrows 151 represent the movement of the slurry 150 injected into the fibrous texture 10. The arrows 152 represent the movement of the medium or liquid phase of the slurry drained by the filtration layer 130 as shown in FIG. 4.

The counter-mould 120 exerts pressure on the fibrous texture 10 during and after the injection step.

In addition, a pumping P can be carried out at the outlet vent 112 during drainage, for example by means of a primary vacuum pump. Such pumping improves drainage and dries the fibrous texture faster.

In this configuration, the filtration layer 130 enables the particles 1500 initially present in the slurry to be retained in the fibrous texture 10 and all or part of these particles are deposited by filtration in the fibrous texture 10.

Once the injection and drainage steps have been carried out, a fibrous preform 15 is obtained comprising the fibrous texture 10 filled with refractory ceramic particles and the filtration layer 130 which is bonded to the texture 10. Adhesion between the filtration layer and the fibrous texture is achieved during injection. Material is deposited between the filtration layer and the fibrous texture and, thanks to the compaction, the assembly is integral. The sintering heat treatment then creates bridges between the particles which complete the adhesion.

The preform obtained is then dried and then demoulded, the preform being able to retain after demoulding the shape adopted in the moulding cavity, for example its shape adopted after compaction between the mould and the counter-mould thanks to the presence of a binder in the slurry such as PVA.

The preform is then subjected to a heat treatment, here sintering, for example in air at a temperature between 1000° C. and 1200° C. in order to pre-sinter the refractory ceramic particles and thus form a refractory ceramic matrix in the porosity of the fibrous texture and the integral filtration layer. A composite material part is then obtained, for example an oxide/oxide composite material part, provided with a fibrous reinforcement formed by the fibrous preform, joining the fibrous texture and the filtration layer, and having a high matrix volume ratio with a homogeneous distribution of the refractory ceramic matrix throughout the fibrous reinforcement.

A part made of a CMC material other than oxide/oxide can be obtained in the same way by producing the fibrous texture and the filtration layer with silicon carbide and/or carbon fibres and using a slurry filled with particles of carbide (for example SiC), boride (for example $TiB_2$), silicide (for example $MoSi_2$) or nitride (for example $Si_3N_4$).

Alternatively, the filled liquid injected into the texture may contain particles of a refractory ceramic precursor, for example sol-gel or polymeric type. In this case, the heat treatment comprises at least one step of transformation of the refractory ceramic precursor into a ceramic material (the so-called ceramisation step), possibly followed by an additional sintering step in order to further densify the composite material part.

Figure 5:
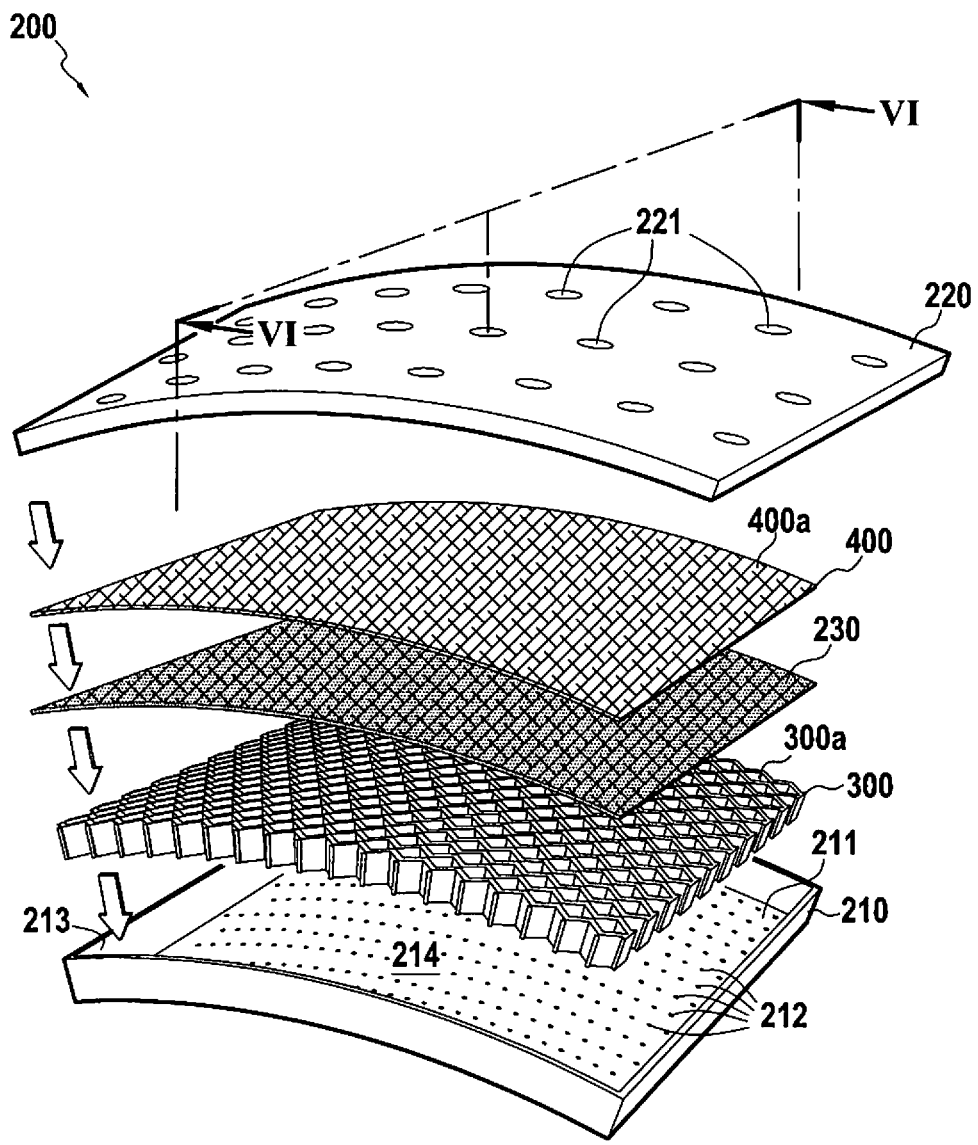
FIG. 5 is a schematic view in exploded perspective of a tool in accordance with another embodiment of the invention.
Figure 6:
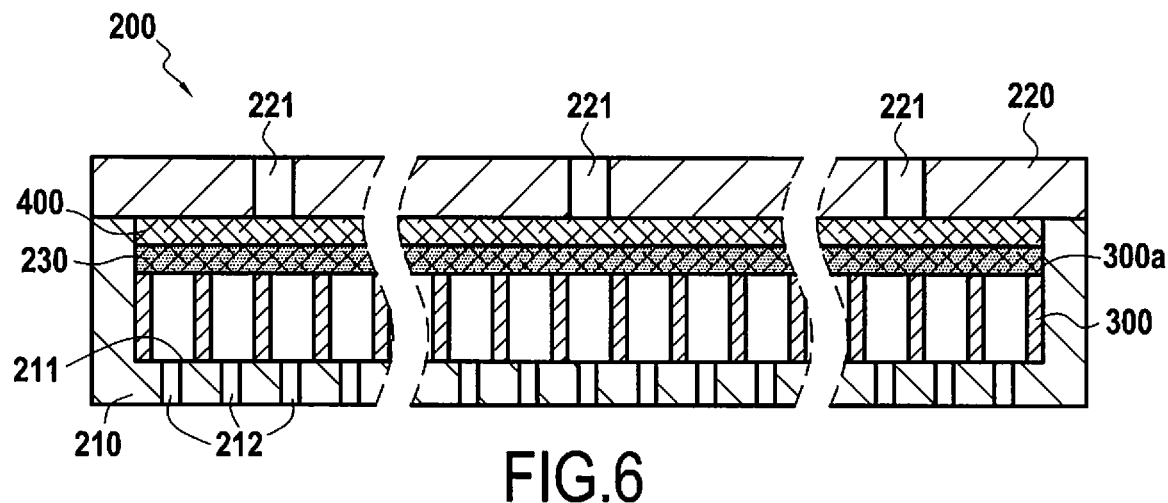
FIG. 6 is a schematic sectional view showing the tooling in FIG. 5 closed with a fibrous skin, filtration layer and honeycomb structure positioned therein.
Figure 7A:
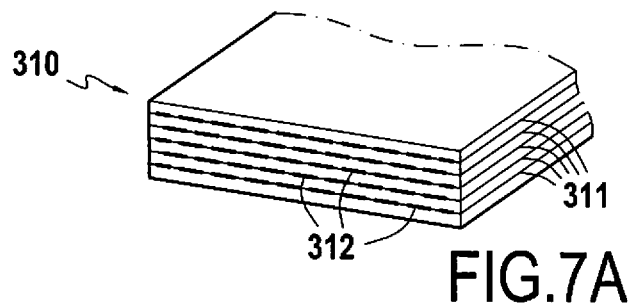
FIGS. 7A to 7C show the manufacture of a deployable fibrous structure intended to form a honeycomb structure.
Figure 7B:
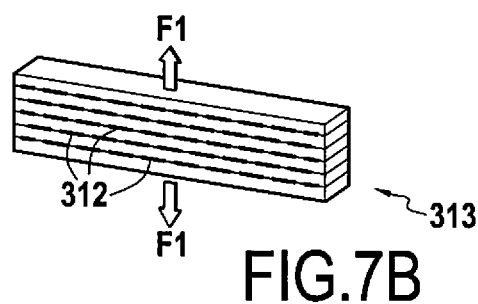
Figure 7C:
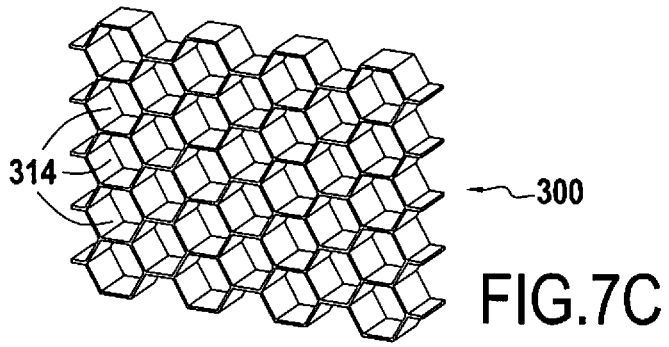

FIGS. 5 to 9 illustrate a process for manufacturing a sound attenuation module according to an embodiment of the invention. As illustrated in FIGS. 5 and 6, a honeycomb structure 300 and a fibrous skin 400 are placed in the tool 200 opposite the upper face 300a of the honeycomb structure. The honeycomb structure 300 may be made, in particular, of metallic material or of composite material or monolithic ceramic. In the case of a composite material, the fibrous reinforcement of the honeycomb structure can be achieved in various ways, such as those described in U.S. Pat. No. 5,415,715, for example, as shown in FIGS. 7A to 7C, by stacking and bonding layers of fabric 311, for example alumina fibre, in a staggered manner to form a blank 310, as shown in FIGS. 7A to 7C. The bonding between the layers 311 is achieved along parallel strips 312, with the strips 312 on one side of a layer being staggered with respect to those on the other side (FIG. 7A). The strips 312 for connecting the layers 311 can be made by gluing or stitching, for example. The stack of layers is cut into sections 313, perpendicular to the glue strips (FIG. 7B). Each section is then stretched in the direction normal to the faces of the layers (arrows f1 in FIG. 7B) to give, by deformation, alveolar structures 3100 with here hexagonal cells 314 (FIG. 7C).

Figure 8A:
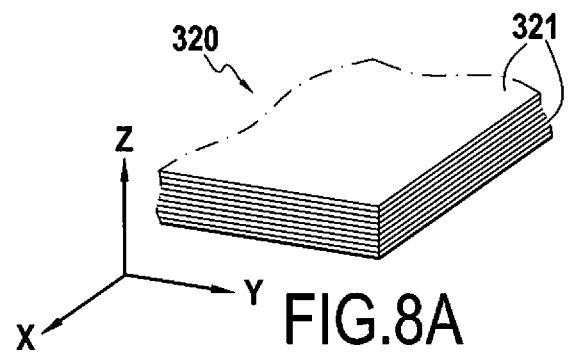
FIGS. 8A to 8C show the manufacture of another deployable fibrous structure to form a honeycomb structure.
Figure 8B:
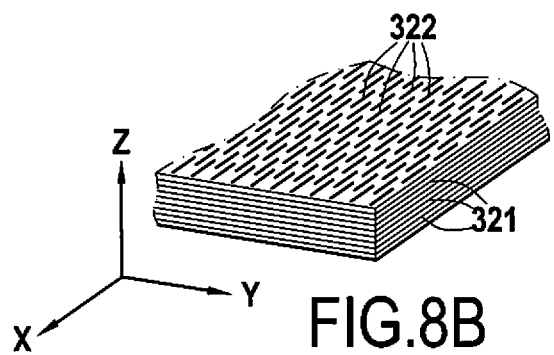
Figure 8C:
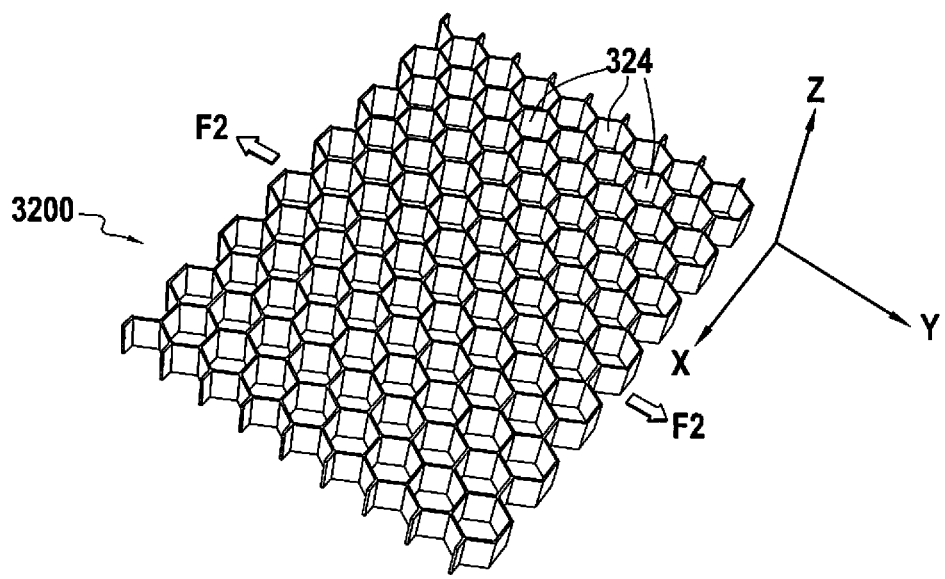

According to an alternative embodiment shown in FIGS. 8A to 8C, two-dimensional layers 321, for example made of SiC fibres, are layered and needled to form a blank 320 (FIG. 8A). The layers 321 are for example layers of fabric or a complex of fabric and fibre fleece, the fibre fleece providing fibres which can be easily removed by the needles during needling for implantation through the layers. As shown in FIG. 8B, slot-shaped cut-outs 322 are staggered in the blank 320, for example by water jet or laser, their dimensions and locations defining the dimensions and shapes of the honeycombs. After the cut-outs have been made, the blank 320 is stretched in a direction perpendicular to the planes of the cut-outs to produce a honeycomb structure 3200 by deformation, here with hexagonal cells 324 (arrows f2 in FIG. 8C).

According to yet another alternative embodiment, the fibrous structure to form the reinforcement of the honeycomb structure can be achieved by arranging strips of fabric in the plane of the honeycomb walls and binding these strips at the junctions between the honeycombs.

According to still another alternative embodiment, a deployable fibrous structure is produced by three-dimensional or multi-layer weaving as described in U.S. Pat. No. 9,631,519.

Once produced, the fibrous reinforcement of the honeycomb structure is densified. In the example described here, the fibrous blank intended to form the fibrous reinforcement of the honeycomb structure 300 is first impregnated with a slurry corresponding to a suspension of an alumina powder in water. Once the liquid phase of the slurry has been removed, the preform is deployed in order to give it the shape of a cellular structure. The expanded blank is then heat treated to consolidate it and form the honeycomb structure 300, which is self-supporting.

In the example described here, the fibrous skin 400 is made by 2D weaving of Nextel 610™ alumina yarns. The fibrous skin 400 is here intended to form the fibrous reinforcement of an acoustic module skin made of an oxide/oxide composite material.

The tool 200 comprises a mould 210 and a counter-mould 120. The mould 210 comprises a bottom 211 with a plurality of vents 212. The mould 210 also comprises a side wall 213 which forms with the bottom 211 a moulding cavity 214. In the example shown, the tool 200 in which the fibrous skin 400, a filtration layer 230 and the honeycomb structure 300 are present is closed in its lower part by the mould 210 and is closed in its upper part by the counter-mould 220 forming a cover closing the tool 200. The mould 210 and the counter-mould 220 are used for dimensioning the preform.

The counter-mould 220 has a plurality of injection ports 221 through which a liquid filled with refractory ceramic particles is intended to be injected to penetrate the porosity of the fibrous skin 400 through the first face 400a of the fibrous skin 400. In the example shown in FIGS. 5 and 6, the filled liquid is to be injected through a plurality of injection ports 221 opening in different areas of the mould cavity.

In accordance with the invention, a filtration layer 230 is interposed between the fibrous skin 400 and the alveolar structure 300 which rests on the bottom 211 of the mould 210 with the vents 212. The filtration layer according to the invention corresponds to a fibrous structure obtained by unidirectional (UD) deposition, or two-dimensional (2D) or three-dimensional (3D) weaving of refractory ceramic fibre yarns made of at least one of the following materials: alumina, mullite, silica, an aluminosilicate, a borosilicate, silicon carbide, carbon or a mixture of several of these materials. The filtration layer is preferably made of refractory ceramic fibres of the same nature as the refractory ceramic fibres of the fibrous skin. The filtration layer preferably has a thickness of between 0.1 mm and 1 mm.

In the example described here, the filtration layer 230 corresponds to a 2D fabric layer made with Nextel 610™ alumina fibre yarns. The filtration layer according to the invention is partially densified in order to form in the layer a network of porosity of a given size allowing the filtrate of the slurry, namely the liquid phase thereof, to pass through, while retaining the particles of refractory ceramics present in the injected slurry.

By way of example, the filtration layer, once partially densified, can have an average pore size of between 0.1 μm and 20 μm with an average porosity volume rate of <50%.

The fibrous structure intended to form the filtration layer can be partially densified by several methods. In particular, the fibrous structure can be pre-impregnated or infused with a slurry filled with refractory particles. In this case, the densification rate and, consequently, the porosity rate present in the filtration layer after the pre-sintering of the particles is adjusted by controlling the particle size, the filler rate and the binder in the slurry. The filtration layer can also be obtained by injecting a refractory particle filled slurry into the fibrous structure, the amount of particles initially introduced controlling the packing thickness and therefore the final matrix volume ratio (Tvm). Coating or quenching processes can also be used to partially densify the fibrous texture intended to form the filtration layer.

In the example described here, the filtration layer 230 is made from a 2D fabric of alumina yarns which has been infused with a slurry filled with 25% by volume of alumina particles, the particles having been pre-sintered to partially densify the filtration layer. The filtration layer 230 allows the liquid to drain out of the fibrous skin 400 and to be discharged through the outlet vents 212 due to the application of a pressure gradient between the outlet vents 212 and the injection ports 221, the liquid passing through the cells of the honeycomb structure 300 to reach the outlet vents 212.

Figure 9:
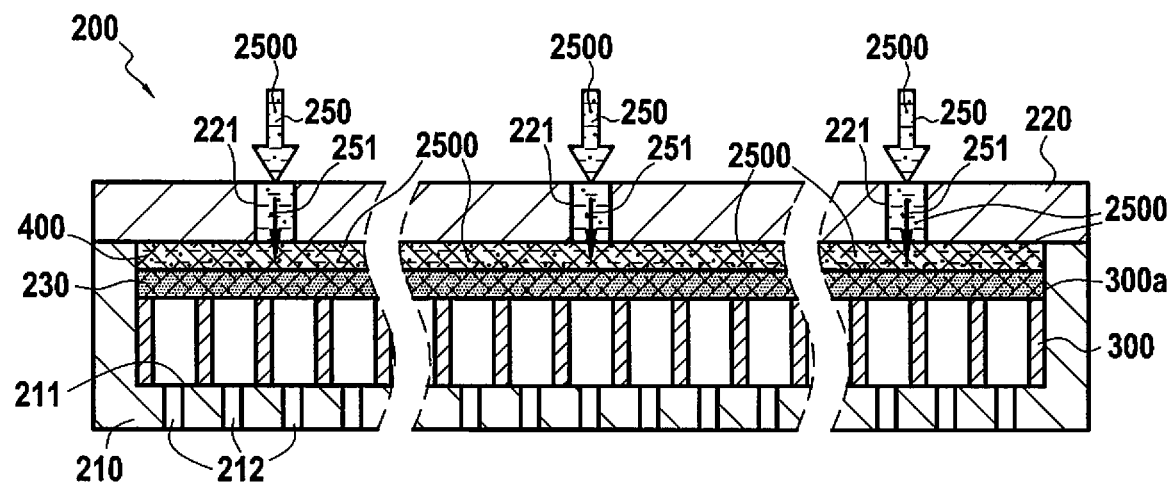
FIG. 9 is a schematic sectional view showing the steps of impregnating a fibrous skin with a slurry filled into the tooling of FIG. 6 in accordance with an embodiment of the process of the invention.

In the example described here, the filled liquid is a slurry containing refractory ceramic particles. FIG. 9 shows the configuration obtained during the injection of a slurry 250 and the drainage of the liquid medium from the slurry. The slurry 250 was injected under pressure through the injection ports 221 so as to penetrate the fibrous skin 400 through its first face 400a. The refractory ceramic particles 2500 present in the slurry 250 are intended to allow the formation of a refractory ceramic matrix in the porosity of the fibrous skin 400. This refractory ceramic matrix can, in an example embodiment, be a refractory oxide matrix.

Slurry can for example be a suspension of alumina powder in water. The average particle size (D50) of the alumina powder can be between 0.1 μm and 2 μm. The alumina powder used can be an alpha alumina powder.

More generally, the slurry can be a suspension comprising refractory ceramic particles or particles of a refractory ceramic precursor with an average particle size of between 0.1 μm and 10 μm. The volume content of particles in the slurry may, prior to injection, be between 20% and 50%. The refractory ceramic particles may comprise a material selected from: alumina, mullite, silica, an aluminosilicate, an aluminophosphate, zirconia, a carbide, a boride and a nitride or a precursor of one or more of these materials. Depending on their basic composition, the refractory ceramic particles or refractory ceramic precursor may, in addition, be mixed with particles of alumina, zirconia, aluminosilicate, a rare earth oxide, rare earth silicate (which may for example be used in environmental or thermal barriers) or any other filler for functionalizing the composite material part to be obtained such as carbon black, graphite or silicon carbide.

The liquid medium of the slurry may, for example, comprise an aqueous phase with an acidic pH (i.e. a pH below 7) and/or an alcoholic phase containing, for example, ethanol. The slurry may contain an acidifying agent such as nitric acid and the pH of the liquid medium may, for example, be between 1 and 5. The slurry may also contain an organic binder such as polyvinyl alcohol (PVA) which is soluble in water.

Figure 10:
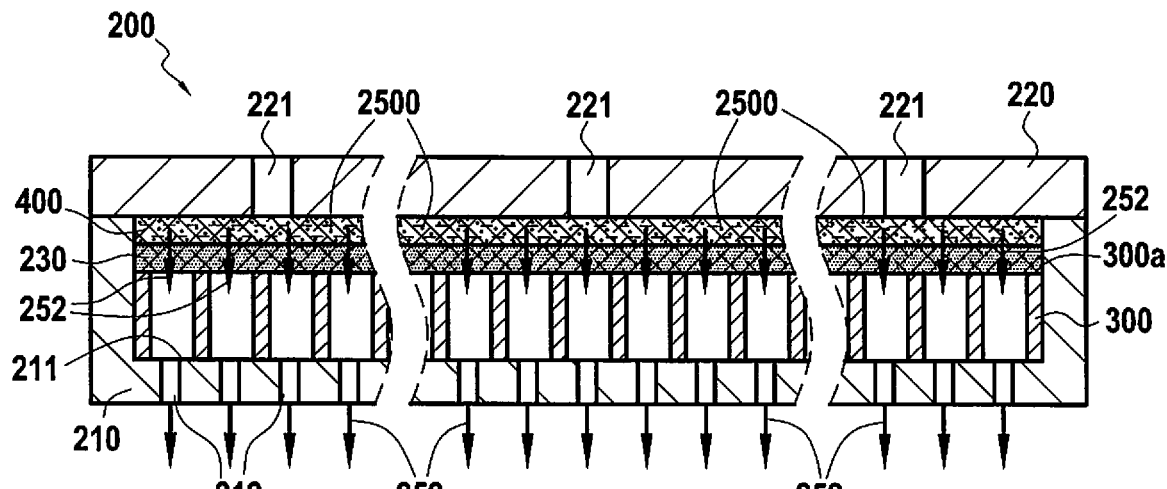
FIG. 10 is a schematic sectional view showing the fibrous skin of FIG. 9 when filled with refractory ceramic particles.
Figure 11:
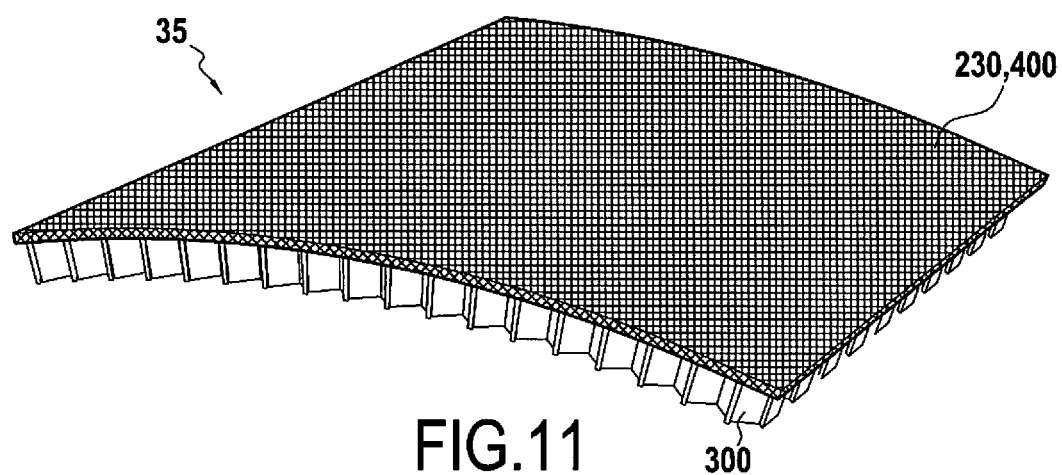
FIG. 11 is a schematic perspective view showing the resulting preform.

As shown in FIG. 9, the refractory ceramic particles 2500 are present after injection of the slurry 250 into the porosity of the fibrous skin 400. The arrows 251 represent the movement of the slurry 250 injected into the fibrous skin 400. The arrows 252 represent the movement of the medium or liquid phase of the slurry drained by the filtration layer 230 as shown in FIG. 10.

Pumping can, in addition, be carried out at the outlet vents 212 during drainage, for example by means of a primary vacuum pump. Such pumping improves drainage and dries the fibrous texture more quickly.

In this configuration, the filtration layer 230 enables the particles 2500 initially present in the slurry to be retained in the fibrous skin 400 and all or part of these particles to be deposited by filtration in the fibrous skin 400.

After the injection and drainage steps have been carried out, a preform 35 is obtained comprising the fibrous skin 400 filled with refractory ceramic particles or particles of a refractory ceramic precursor, the filtration layer 230 and the honeycomb structure 300, the filtration layer 230 being bonded to the fibrous skin 400 and the honeycomb structure 300. The adhesion between the filtration layer and the fibrous skin is achieved during injection. Material is deposited between the filtration layer and the fibrous skin and, due to the compaction, the whole is firmly bonded together. The sintering heat treatment then creates bridges between the particles which complete the adhesion. The preform obtained is then dried and then demoulded, the preform being able to retain the shape adopted in the moulding cavity after demoulding.

The preform is then subjected to a heat treatment, in this case pre-sintering, for example in air at a temperature between 1000° C. and 1200° C. in order to bridge the refractory ceramic particles with each other and thus form a refractory ceramic matrix in the porosity of the fibrous texture and the integral filtration layer.

The result is a sound attenuation module made of a composite material, for example an oxide/oxide composite part with a fibrous reinforcement formed by the fibrous preform, which combines the fibrous texture, the filtration layer and the honeycomb structure.

A part made of a CMC material other than oxide/oxide can be obtained in the same way by producing the fibrous skin, filtration layer and honeycomb structure with silicon carbide and/or carbon fibres and using a slurry filled with particles of carbide (for example SiC), boride (for example $TiB_2$), silicide (for example $MoSi_2$) or nitride (for example $Si_3N_4$).

Alternatively, the filled liquid injected into the fibrous skin may contain particles of a refractory ceramic precursor, for example sol-gel or polymeric type. In this case, the heat treatment comprises at least one step of transformation of the refractory ceramic precursor into a ceramic material (the so-called ceramisation step), possibly followed by an additional sintering step in order to further densify the composite material part.

The manufacture of the sound attenuation module can also be supplemented by the formation of a second skin on the underside of the honeycomb structure. For this purpose, the sound damping module is placed in a mould having a configuration similar to the previously described tool 200 and by placing a lower fibrous skin similar to the already described upper fibrous skin 400 opposite the underside of the honeycomb structure, a filtration layer similar to the filtration layer 230 being interposed between the fibrous skin and the honeycomb structure. In this case, the mould used differs from the tool 200 in that the filled slurry is injected on the opposite side, i.e. on the side on which the vents 212 are present in the tool 200, which are then replaced by injection ports, and in that the liquid phase of the slurry is discharged on the side of the tool where the injection ports 221 are present, which are then replaced by vents. In addition, in order to allow the liquid phase of the slurry which has passed through the filtration layer and the honeycomb structure to be discharged, perforations are made in the upper skin. These perforations can be advantageously useful later on in the operation of the acoustic attenuation module. Indeed, it is common to make perforations in one of the skins of such a module in order to facilitate the trapping of acoustic waves in the alveoli of the alveolar structure.

In an alternative embodiment of a sound attenuation module, an upper fibrous skin and a lower skin with a honeycomb structure between them are placed in a tool with a geometry similar to that of the tool 200 described above. In this case, the filled slurry is injected simultaneously into the upper and lower fibrous skins and drainage of the solvent from the slurry is carried out on the edges of the alveolar structure(s) against which one or more filtration layers are placed.

According to another alternative embodiment of a sound attenuation module, a fibrous skin is placed in a tool similar to the tool 200 described above opposite a plurality of adjacent alveolar structures with the interposition of a filtration layer between the fibrous skin and the alveolar structure. The moulding cavity may have a straight or curved shape as in the tool 200. The moulding cavity may also be a complete ring or ring sector shape in which the honeycomb structures, the fibrous skin and the filtration layer are placed. In this way, it is possible to form sound attenuation modules in a single operation, which can be mounted around devices such as aircraft engines, for example.

In yet another alternative embodiment, the honeycomb structure can be replaced by a ventilated structure, for example in the form of corrugated sheet metal or similar.

The process of the invention can also advantageously be used for the manufacture of composite material parts with complex geometries, in particular parts with semi-annular, annular and frustoconical shapes. The process of the invention can therefore be used to manufacture parts made of composite material such as crankcases, combustion chambers or rear bodies (plugs) of aeronautical engines. In this case, the moulding and injection tool of the filled slurry is adapted to the shape of the part to be made, the fibrous texture to be injected and the associated filtration layer easily conforms to the geometry of the mould of the tool, which is more complicated when a rigid part made of porous material is used for the drainage of the liquid phase of the slurry.

The invention claimed is:

1. A process for manufacturing a composite material part comprising:
forming a fibrous texture from refractory ceramic fibres,
placing the fibrous texture in a mould having at least one injection port and at least one evacuation port, a filtration layer being interposed between the fibrous texture and said at least one evacuation port, the filtration layer comprising a partially densified fibrous structure that comprises unidirectional yarns or two-dimensional or three-dimensional weave of yarns,
pressure injecting a slurry containing a powder of refractory ceramic particles into the fibrous texture,
draining by the filtration layer the solvent of the slurry having passed through the fibrous texture and retaining the powder of refractory ceramic particles within said texture by the filtration layer so as to obtain a fibrous preform comprising at least the fibrous texture filled with refractory ceramic particles and the filtration layer, the solvent being discharged through said at least one discharge port, and
heat treating the fibrous preform comprising at least the fibrous texture filled with refractory ceramic particles and the filtration layer so as to sinter or transform the refractory ceramic particles present in the fibrous texture of the preform in order to form a composite material part comprising at least said fibrous texture densified by a refractory ceramic matrix and the filtration layer.

2. The process as claimed in claim 1, wherein the filtration layer comprises refractory ceramic fibres of the same nature as the refractory ceramic fibres of the fibrous texture and wherein the filtration layer is partially densified with pre-sintered refractory ceramic particles of the same nature as the refractory ceramic particles deposited in the fibrous texture.

3. The process as claimed in claim 1, wherein the filtration layer has an average pore size of between 0.1 µm and 20 µm with a volume-average porosity of less than 50%.

4. The process as claimed in claim 1, wherein the fibre texture comprises a fibre structure obtained by two-dimensional weaving, or three-dimensional or multi-layer weaving, or automatic placement of unidirectional fibres.

5. The process as claimed in claim 1, wherein the fibrous texture corresponds to a fibrous skin placed opposite one face of a cellular structure, the fibrous skin and the cellular structure being placed in the mould with interposition of the filtration layer between said fibrous skin and said cellular structure, the composite material part obtained comprising the fibrous skin densified by a refractory ceramic matrix, the filtration layer and the cellular structure.

6. The process as claimed in claim 1, wherein the fibrous texture corresponds to a fibrous skin placed opposite the faces of a plurality of alveolar structures, the fibrous skin and the alveolar structures being placed in the mould with interposition of the filtration layer between said fibrous skin and said alveolar structures, the composite material part obtained comprising the fibrous skin densified by a refractory ceramic matrix, the filtration layer and the alveolar structures.

7. The process as claimed in claim 1, wherein the mould has an annular or frustoconical geometry of revolution, the fibrous texture and the filtration layer being shaped into an annular or frustoconical geometry of revolution when placed in the mould.

8. The process as claimed in claim 1, wherein the yarns of the fibrous texture are formed of fibres consisting of one or more of the following materials: alumina, mullite, silica, an aluminosilicate, a borosilicate, silicon carbide and carbon.

9. The process as claimed in claim 1, wherein the refractory ceramic particles are of a material selected from: alumina, mullite, silica, an aluminosilicate, an aluminophosphate, zirconia, a carbide, a boride, a silicide and a nitride or a mixture of several of these materials.

10. A composite material part obtained in accordance with the process as claimed in claim 1, wherein it constitutes a rear body part, a combustion chamber or a crankcase of an aircraft engine.

11. The process as claimed in claim 1, wherein, during the pressure injecting, the filtration layer and the fibrous structure adhere to each other so that the filtration layer forms an integral part of the composite material part.

12. The process as claimed in claim 11, wherein the heat-treating is a sintering heat treatment that heat treats the fibrous structure and the filtration layer.

\* \* \* \* \*